United States Patent
Lee et al.

(10) Patent No.: US 10,728,712 B2
(45) Date of Patent: Jul. 28, 2020

(54) METHODS AND APPARATUSES FOR SUPPORTING WIRELESS COMMUNICATION OF VEHICLE

(71) Applicants: Samsung Electronics Co., Ltd., Suwon-si, Gyeonggi-do (KR); Research & Business Foundation SUNGKYUNKWAN UNIVERSITY, Suwon-si, Gyeonggi-do (KR)

(72) Inventors: Ho-Yeon Lee, Seongnam-si (KR); Min-Young Chung, Seoul (KR); Hyung-Jin Choi, Seoul (KR); Sung-Hoon Kim, Suwon-si (KR); Jun-Suk Kim, Suwon-si (KR); Young-Kyo Baek, Seoul (KR); Jung-Je Son, Yongin-si (KR); Seung-Ri Jin, Suwon-si (KR); Han-Jun Kim, Seoul (KR); Kyung-Hoon Lee, Suwon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 133 days.

(21) Appl. No.: 15/923,207

(22) Filed: Mar. 16, 2018

(65) Prior Publication Data
US 2018/0270624 A1    Sep. 20, 2018

(30) Foreign Application Priority Data
Mar. 17, 2017  (KR) ........................ 10-2017-0033983

(51) Int. Cl.
*H04W 4/06*  (2009.01)
*H04W 4/40*  (2018.01)
(Continued)

(52) U.S. Cl.
CPC ............ *H04W 4/06* (2013.01); *H04L 65/1063* (2013.01); *H04W 4/023* (2013.01); *H04W 4/40* (2018.02);
(Continued)

(58) Field of Classification Search
CPC ......... H04W 4/06; H04W 4/023; H04W 4/40; H04W 76/40; H04W 24/10
See application file for complete search history.

(56) References Cited

U.S. PATENT DOCUMENTS 8,731,557 B2    5/2014  Svedevall et al.
2013/0055301 A1*  2/2013  Hao ....................... H04H 20/57
725/14
(Continued)

FOREIGN PATENT DOCUMENTS

KR    10-2015-0117658 A    10/2015
KR    10-2016-0078381 A    7/2016

OTHER PUBLICATIONS

3GPP, Study on Architecture Enhancements for LTE support of V2X Services, 3GPP TR 23.785, v14.0.0, Sep. 26, 2016.
3GPP, Multimedia Broadcast/Multicast Service (MBMS); Architecture and Functional Description, 3GPP TS 23.785, v14.0.0, Sep. 26, 2016.
ETSI MCC, Report of 3GPP TSG RAN WG2 meeting #93bis, Apr. 15, 2016, Dubrovnik, Croatia, R2-163343.

*Primary Examiner* — Min Jung
(74) *Attorney, Agent, or Firm* — Jefferson IP Law, LLP

(57) ABSTRACT

A method for providing a multimedia broadcast/multicast service (MBMS) to a terminal related to a vehicle by a broadcast and multicast service center (BM-SC) is provided. The method includes identifying at least one candidate service area that the terminal is predicted to pass through, and transmitting, to an MBMS-gateway (MBMS-GW), a request for configuring the radio bearer of the at least one candidate service area.

11 Claims, 13 Drawing Sheets

(51) Int. Cl.
    *H04L 29/06*     (2006.01)
    *H04W 24/10*     (2009.01)
    *H04W 4/02*     (2018.01)
    *H04W 76/40*     (2018.01)
    *H04W 84/04*     (2009.01)
    *H04W 88/16*     (2009.01)
    *H04W 72/00*     (2009.01)
    *H04W 64/00*     (2009.01)

(52) U.S. Cl.
    CPC ........... *H04W 24/10* (2013.01); *H04W 76/40* (2018.02); *H04W 64/00* (2013.01); *H04W 72/005* (2013.01); *H04W 84/042* (2013.01); *H04W 88/16* (2013.01)

(56) References Cited

U.S. PATENT DOCUMENTS

| | | | |
|---|---|---|---|
| 2013/0276017 A1* | 10/2013 | Walker | H04N 21/44204 725/25 |
| 2014/0003327 A1* | 1/2014 | Seo | H04W 36/08 370/315 |
| 2015/0373506 A1 | 12/2015 | Jung et al. | |
| 2016/0211980 A1 | 7/2016 | Zhu et al. | |
| 2017/0086049 A1* | 3/2017 | Vrzic | H04L 45/306 |
| 2017/0142766 A1* | 5/2017 | Kim | H04W 48/20 |
| 2018/0049274 A1* | 2/2018 | Kim | H04W 36/245 |
| 2019/0289505 A1* | 9/2019 | Thomas | H04W 36/32 |
| 2019/0364492 A1* | 11/2019 | Azizi | H04W 24/08 |

* cited by examiner

METHODS AND APPARATUSES FOR SUPPORTING WIRELESS COMMUNICATION OF VEHICLE

CROSS-REFERENCE TO RELATED APPLICATION(S)

This application is based on and claims priority under 35 U.S.C. § 119(a) of a Korean patent application number 10-2017-0033983, filed on Mar. 17, 2017, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) SAMSUNG ELECTRONICS CO., LTD. and 2) Research & Business Foundation SUNGKYUNKWAN UNIVERSITY.

BACKGROUND

1. Field

The disclosure relates to methods and apparatuses for supporting wireless communication of a vehicle.

2. Description of Related Art

With the advancement of wireless communication technology, there is a need for methods and apparatuses for supporting wireless communication of a vehicle in order to control the vehicle and provide the same with information. The types of communication performed by a vehicle include vehicle-to-vehicle (V2V) communication, vehicle-to-infrastructure (V2I) communication, vehicle-to-application server (or Network) (V2N) communication, and vehicle-to-pedestrian (V2P) communication. The types of communication performed by a vehicle may be comprehensively referred to as "vehicle-to-everything (V2X) communication".

A vehicle which is running continuously communicates with a road infrastructure and another vehicle through V2X communication technology and exchanges and shares useful information, including traffic conditions (e.g., a collision warning and whether an accident occurs in front of the vehicle) and the like, so that a traffic accident can be prevented from happening to a driver or pedestrian and can promote an efficient traffic flow. Also, through V2X communication, a driver can be provided with various entertainment services. In addition, V2X communication technology may be required for information collection and vehicle control for autonomous driving of a vehicle. However, in a V2X communication scenario where a vehicle can run at a high speed, low-delay and high-reliability transmission/reception of a V2X message is required to prevent a traffic accident which may endanger a driver's life.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus capable of achieving low-delay and high-reliability transmission in a vehicle or a vehicle-related terminal, and the disclosure is particularly related to provision of a multimedia broadcast/multicast service (MBMS) or device-to-device (D2D) communication to a vehicle or a vehicle-related terminal.

In accordance with an aspect of the disclosure, a method for providing an MBMS to a terminal related to a vehicle by a broadcast and multicast service center (BM-SC) is provided. The method includes identifying at least one candidate service area that the terminal is predicted to pass through, and transmitting, to an MBMS-gateway (MBMS-GW), a request for configuring a radio bearer of the at least one candidate service area.

In accordance with another aspect of the disclosure, a BM-SC for providing an MBMS to a terminal related to a vehicle is provided. The BM-SC includes a transceiver, and at least one processor connected to the transceiver and configured to identify at least one candidate service area that the terminal is predicted to pass through, and transmit, to an MBMS-GW, a request for configuring a radio bearer of the at least one candidate service area.

In accordance with another aspect of the disclosure, a method for providing an MBMS to a terminal related to a vehicle by an MBMS-GW is provided. The method includes receiving, from a BM-SC, a request for configuring a radio bearer of at least one candidate service area that the terminal is predicted to pass through, and configuring the radio bearer of the at least one candidate service area in response to the request.

The method, wherein the configuring of the radio bearer comprises transmitting, to a mobility management entity (MME), a first session update request comprising information on the candidate at least one service area, which the terminal is predicted to pass through, and information on a serving service area for the terminal, and wherein the MME is configured to: transmit, to a serving base station for the terminal, a second session update request comprising the information on the serving service area for the terminal, and transmit, to a base station for the at least one candidate service area, a third session update request comprising the information on the at least one candidate service area.

The method further includes receiving, from the MME, a radio bearer switching request generated in response to entry of the terminal to one service area from among the at least one candidate service area; and switching a radio bearer for the terminal from a radio bearer of a current service area for the terminal to a radio bearer of the one service area from among the at least one candidate service area, based on the radio bearer switching request in response to the radio bearer switching request.

In accordance with another aspect of the disclosure, an MBMS-GW for providing an MBMS to a terminal related to a vehicle is provided. The MBMS-GW includes a transceiver, and at least one processor connected to the transceiver and configured to receive, from a BM-SC, a request for configuring a radio bearer of at least one candidate service area that the terminal is predicted to pass through, and configure the radio bearer of the at least one candidate service area in response to the request.

In accordance with another aspect of the disclosure, a method for providing an MBMS to a terminal related to a vehicle by an application server (AS) is provided. The method includes identifying at least one candidate public land mobile network (PLMN) capable of providing an MBMS to the terminal in a first service area, selecting a PLMN configured to provide the MBMS to the terminal from among the at least one candidate PLMN, and transmitting, to a BM-SC of the selected PLMN, a request for providing the MBMS to the terminal.

In accordance with another aspect of the disclosure, an AS for providing an MBMS to a terminal related to a vehicle is provided. The AS includes a transceiver, and at least one processor connected to the transceiver and configured to identify at least one candidate PLMN capable of providing an MBMS to the terminal in a first service area, select a PLMN configured to provide the MBMS to the terminal from among the at least one candidate PLMN, and transmit, to a BM-SC of the selected PLMN, a request for providing an MBMS to the terminal.

In accordance with another aspect of the disclosure, a method for providing an MBMS to a terminal related to a vehicle by a BM-SC is provided. The method includes receiving, from an AS, a request for conversion of information related to a service area, generating location information, which is representative of the service area, in response to the receiving of the request, and transmitting the location information, which is representative of the service area, to the AS, wherein the location information which is representative of the service area does not include information on locations of at least one cell and at least one base station within the service area.

In accordance with another aspect of the disclosure, a BM-SC for providing an MBMS to a terminal related to a vehicle is provided. The BM-SC includes a transceiver, and at least one processor connected to the transceiver and configured to receive, from an AS, a request for conversion of information related to a service area, generate location information, which is representative of the service area, in response to the reception of the request, and transmit the location information, which is representative of the service area, to the AS, wherein the location information which is representative of the service area does not include information on locations of at least one cell and at least one base station within the service area.

In accordance with another aspect of the disclosure, a method for performing D2D communication by a terminal related to a vehicle is provided. The method includes transmitting scheduling assignment information through a control channel, and transmitting data related to the scheduling assignment information through a shared channel, wherein the control channel is divided into multiple control areas respectively corresponding to priorities according to types of vehicles, and wherein the scheduling assignment information is transmitted through a control area corresponding to a priority of the vehicle among the multiple control areas.

The method, wherein the multiple control areas are sequentially placed in time according to priorities respectively corresponding to the multiple control areas, and, as a priority becomes higher, a control area corresponding to the priority is preferentially placed in time.

The method, wherein the shared channel is divided into multiple shared areas respectively corresponding to priorities according to types of vehicles, and wherein the data is transmitted through a shared area corresponding to a priority of the vehicle among the multiple shared areas.

The method, wherein the multiple shared areas are sequentially placed in time according to priorities respectively corresponding to the multiple shared areas, and, as a priority becomes higher, a shared area corresponding to the priority is preferentially placed in time.

In accordance with another aspect of the disclosure, a terminal related to a vehicle for performing D2D communication is provided. The terminal includes a transceiver, and at least one processor connected to the transceiver and configured to transmit scheduling assignment information through a control channel, and transmit data related to the scheduling assignment information through a shared channel, wherein the control channel is divided into multiple control areas respectively corresponding to priorities according to types of vehicles, and wherein the scheduling assignment information is transmitted through a control area corresponding to a priority of the vehicle among the multiple control areas.

Particulars of other embodiments will be described and illustrated in the detailed description and the accompanying drawings.

Various embodiments provide at least the following advantageous effects.

That is, a low-delay and high-reliability MBMS can be provided to a vehicle-related terminal.

Also, a vehicle-related terminal having a higher priority can be provided with stable D2D communication without allocating additional wireless resources.

The advantageous effects of the disclosure are not limited to the above disclosure set forth by way of example, and more various advantageous effects will be described in the specification.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms "first", "second", and the like are used to describe various elements, it goes without saying that the elements are not limited by the terms. The terms are used only to distinguish one element from other elements. Accordingly, it goes without saying that the first element described below may be a second element in the technical idea of the disclosure.

Vehicles, located in a particular area of a road, and terminals of passengers riding therein may have a common location and a common movement direction. The passengers may be regarded as one group, and a multimedia broadcast/multicast service (MBMS) may be used to provide a common content to the group. In an MBMS, users within a particular cell may share a radio resource and may receive the same data through a common channel allocated by a base station.

Figure 1:
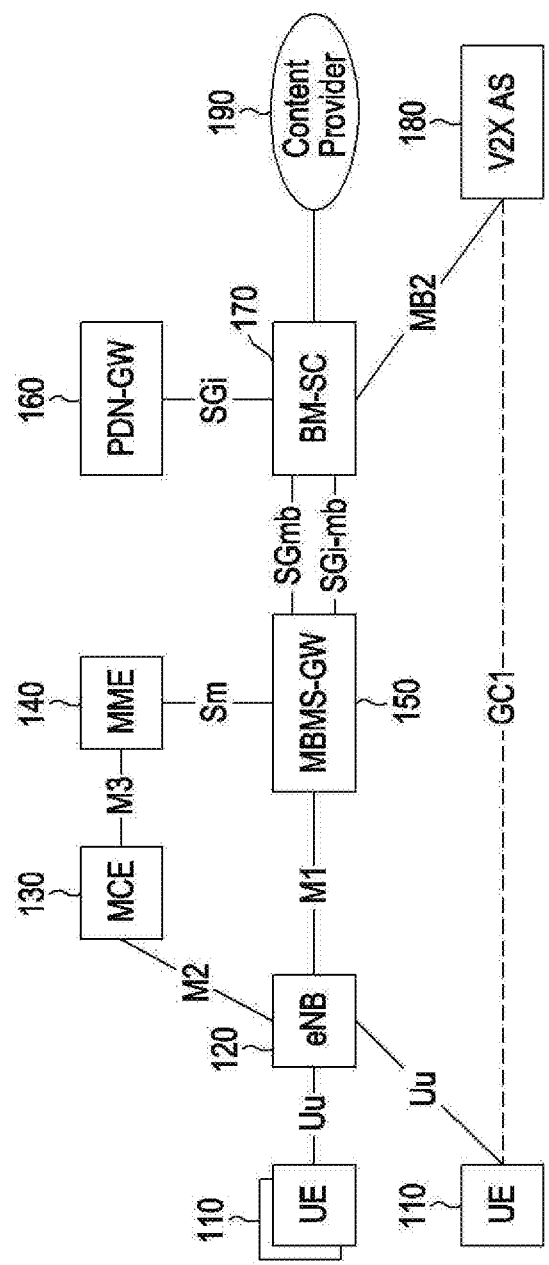
FIG. 1 is a view illustrating an multimedia broadcast/multicast service (MBMS) architecture according to an embodiment of the disclosure.

FIG. 1 is a view illustrating an MBMS architecture according to an embodiment of the disclosure.

Referring to FIG. 1, a user equipment (UE) 110 may be replaced by another term, such as a terminal, a mobile terminal, a mobile device, or an access terminal, known as an equivalent term to those skilled in the art. In a vehicle-to-everything (V2X) communication environment, the UE 110 may be related to a vehicle. For example, the UE 110 may be installed or disposed in a vehicle, or may be carried by a driver of the vehicle or a passenger. The UE 110 may receive an MBMS, transmitted by an evolved node B (eNB) 120, through a Uu interface. Also, the UE 110 may communicate with a V2X application server (V2X AS) 180 through a GC1 interface.

The eNB 120 may be replaced by another term, such as a base station or a Node B, known as an equivalent term to those skilled in the art. The eNB 120 may provide an MBMS to the UE 110 through the Uu interface. The eNB 120 may be connected to an MBMS-GW 150 through an M1 interface, and may be connected to a multi-cell/multicast coordination entity (MCE) 130 through an M2 interface.

The MBMS-GW 150 is a logical entity. The MBMS-GW 150 may be integrated in the eNB 120 or may be disposed separate therefrom. The MBMS-GW 150 transmits MBMS packets to the eNB 120 through the M1 interface. The eNB 120 may provide an MBMS to the UE 110 on the basis of the received MBMS packets. The MBMS-GW 150 may use an internet protocol (IP) multicast to transmit MBMS user data to the eNB 120. The MBMS-GW 150 may perform MBMS session control signaling towards the MCE 130 and the eNB 120 through an MME 140. The MBMS-GW 150 may be connected to the MME 140 through an Sm interface.

The MCE 130 is a logical entity. The MCE 130 may be integrated in the eNB 120 or may be disposed separate therefrom. The MCE 130 may allocate radio resources for MBMS transmission which are used by the eNB 120. The MCE 130 may be connected to the MME 140 through an M3 interface. Through the M3 interface, Radio Access Bearer (RAB)-level MBMS session control signaling may be performed.

The MME 140 may perform MBMS control signaling including a session start, update, and interruption. Also, the MME 140 may deliver additional MBMS information, which includes quality of service (QoS) and an MBMS service area, to the MCE 130.

A broadcast and multicast service center (BM-SC) 170 serves to supply or deliver an MBMS over a public land mobile network (PLMN). The BM-SC 170 may comprehensively control an MBMS. The BM-SC 170 may comprehensively control an MBMS. The BM-SC 170 may support authorization for MBMS transmission and MBMS bearer configuration and initiation thereof. The BM-SC 170 may deliver MBMS transmission by adjusting scheduling of transmissions delivered through an MBMS session and an MBMS bearer, and may establish, control, and manage an MBMS session and an MBMS bearer. The BM-SC 170 may be connected to the MBMS-GW 150 through an SGmb interface and an SGi-mb interface, and may be connected to a packet data network gateway (PDN-GW) 160 through an SGi interface.

The PDN-GW 160 may assign an IP address to the UE 110, and may manage traffic of UEs.

A content provider 190 may provide the BM-SC 170 with a content to be provided to the UE 110 through an MBMS.

The V2X AS 180 may receive uplink data from a UE through unicast, and may deliver data to UEs within a target area through unicast and/or MBMS delivery. Also, the V2X AS 180 may map geographical location information to appropriate target service area information (SAI) for broadcast, and may map geographical location information to an appropriate target cell identifier (e.g., evolved universal terrestrial radio access (E-UTRAN) cell global identifier (ECGI)) for broadcast. The V2X AS 180 may map a cell identifier, which a UE provides for broadcast, to an appropriate target MBMS SAI. The V2X AS 180 may provide the BM-SC 170 with an appropriate cell identifier and/or appropriate MBMS SAI. The V2X AS 180 may have local MBMS (L.MBMS) information (e.g., IP multicast address, multicast source, and common tunnel identification (C-TEID)) pre-configured therein. The V2X AS 180 may transmit L.MBMS information to the BM-SC 170. The V2X AS 180 may request the BM-SC 170 to allocate or deallocate a set of temporary mobile group identities (TMGIs), and may require the same to activate, deactivate, and modify an MBMS bearer. The V2X AS 180 may communicate with the BM-SC 170 through an MB2 interface.

A SA in which a vehicle-related terminal is provided with an MBMS may be frequently changed according to the movement of a vehicle. In order to provide an uninterrupted MBMS to the vehicle-related terminal, it is necessary to reduce a delay caused by configuration of a new radio bearer according to the change of a SA. According to an embodiment, in order to quickly change a radio bearer, a radio bearer may be configured for a candidate SA that a vehicle is predicted to enter, and when the vehicle enters the candidate SA, switching from a radio bearer of a serving SA to the radio bearer of the candidate SA may be performed. Methods for switching a radio bearer as described above will be described.

Figure 2:
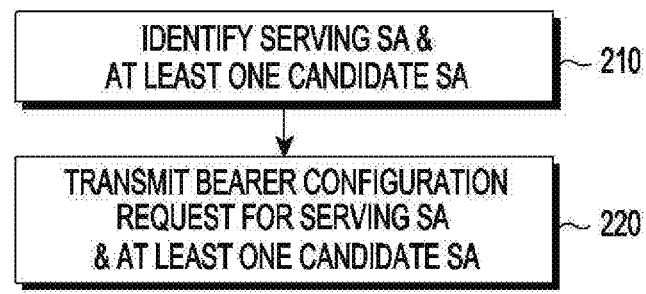
FIG. 2 is a flowchart illustrating an operation of a broadcast and multicast service center (BM-SC) according to an embodiment of the disclosure.

FIG. 2 is a flowchart illustrating an operation of a BM-SC according to an embodiment of the disclosure.

The BM-SC may be the BM-SC 170 described with reference to FIG. 1. In operation 210, the BM-SC may identify a serving SA and at least one candidate SA for a vehicle-related terminal. The BM-SC may identify at least one candidate SA on the basis of a cell or serving SA, in which the vehicle-related terminal (or vehicle) is currently located, and the movement direction of the vehicle-related terminal (or vehicle). In some embodiments, when the BM-SC has already recognized the serving SA, in operation 210, the BM-SC may identify only at least one candidate SA. It is not necessary to simultaneously identify the serving SA and the at least one candidate SA. The BM-SC may differently apply a method for identifying a candidate SA on the basis of the type of a road, on which the vehicle-related terminal is located, and/or network deployment information.

Figure 3:
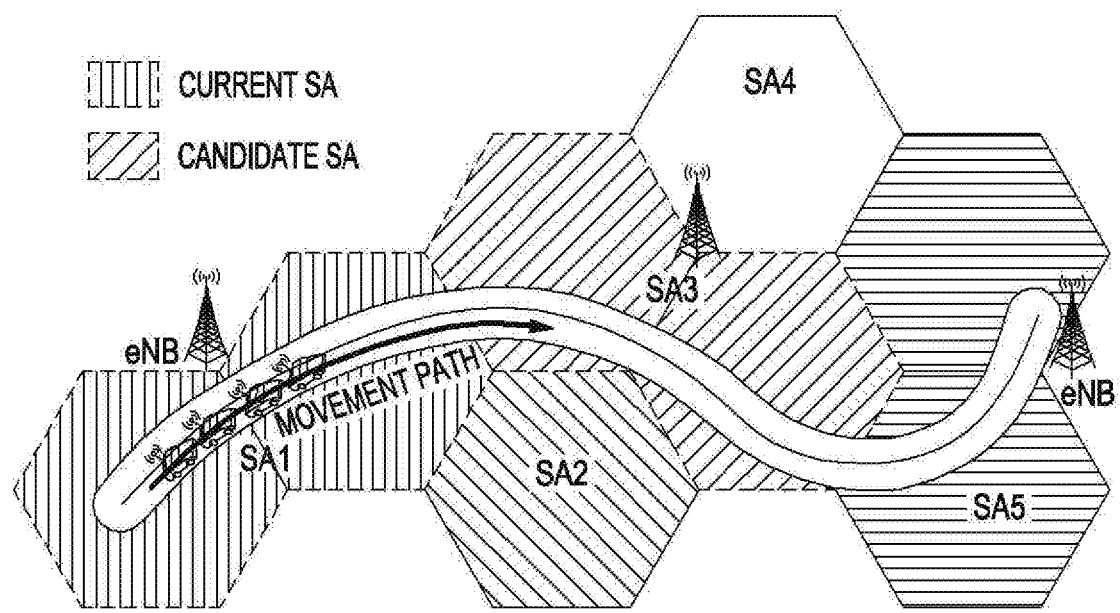
FIG. 3 is a view illustrating a service area (SA) prediction method according to an embodiment of the disclosure.

FIG. 3 illustrates a SA prediction method according to an embodiment when a terminal (i.e., vehicle) moves on a road (e.g., expressway) of which a proceeding direction rarely changes according to an embodiment of the disclosure.

Each of hexagonal areas illustrated in FIG. 3 corresponds to one cell. When a terminal moves on a road of which a proceeding direction rarely changes, a candidate SA can be identified at high accuracy on the basis of the geographical deployment of the road. For example, in FIG. 3, a SA1 in which a terminal (or terminal group, or a vehicle or vehicle group) is currently located may be identified as a serving SA, and when the geographical deployment of the road is considered, a SA3 that the terminal is predicted to subsequently pass through may be identified as a candidate SA. According to some embodiments, a SA5 that the terminal is predicted to pass through after the SA3 may also be identified as a candidate SA.

In the case of a road (e.g., a road in the city center) including multiple intersections and slip roads, it may be difficult to predict a proceeding path of a terminal on the basis of only the geographical deployment of the road and network deployment information. When a terminal (or terminal group, or a vehicle or vehicle group) uses a navigation system, a candidate SA may be identified on the basis of information on a path (e.g., a path for reaching the destination) configured by the navigation system. When a vehicle related to the terminal is, for example, a bus or train which is running on a fixed path, a candidate SA may be identified on the basis of the determined path. In some embodiments, a BM-SC may receive, from an application server (AS) (e.g., the V2X AS 180), information on a path configured by a navigation system and/or information on a fixed path of a vehicle.

In another embodiment, an AS may acquire information on the geographical deployment of a road, information on a path configured by a navigation system, and/or information on a fixed path of a vehicle, may determine a candidate SA on the basis of the acquired information, and may then notify a BM-SC of a candidate SA.

In still another embodiment, an AS may determine at least one cell that a terminal (or vehicle) is predicted to pass through, on the basis of information on the geographical deployment of a road, information on a path configured by a navigation system, and/or information on a fixed path of a vehicle, and may transmit, a BM-SC, an identifier (e.g., ECGI) of each of the predicted at least one cell. The BM-SC may identify a candidate SA on the basis of the received cell identifier.

Referring again to FIG. 2, in operation 220, the BM-SC may transmit, to an MBMS-GW, a bearer configuration request for the serving SA and at least one candidate SA. In some embodiments, when a bearer of the serving SA has already been configured, a bearer configuration request for at least one candidate SA may transmitted to the MBMS-GW. Through this process, a radio bearer is pre-configured for the candidate SA that the terminal (or vehicle) is predicted to pass through or enter, so as to, when the terminal (or vehicle) enters the candidate SA, switching from the radio bearer of the serving SA to the pre-configured radio bearer of the candidate SA is performed without newly configuring a radio bearer, thereby providing an uninterrupted MBMS to the terminal.

In some embodiments, before operation 210, the BM-SC may determine whether a path along which the terminal is to move is capable of being predicted. For example, when it is difficult to predict a proceeding path of the terminal on the basis of the geographical deployment of a road on which the vehicle is located as described above, when it is impossible to acquire the information on a path configured by a navigation system installed in the vehicle as described above, and when the vehicle is not running on the fixed path as described above, an expected path of the terminal may be determined to be unpredictable. When the expected path of the terminal is determined to be unpredictable, operation 210 may not be performed, and a radio bearer may also not be configured for a candidate SA.

Hereinafter, a method for configuring a radio bearer of a candidate SA will be described in more detail with reference to FIG. 4.

Figure 4:
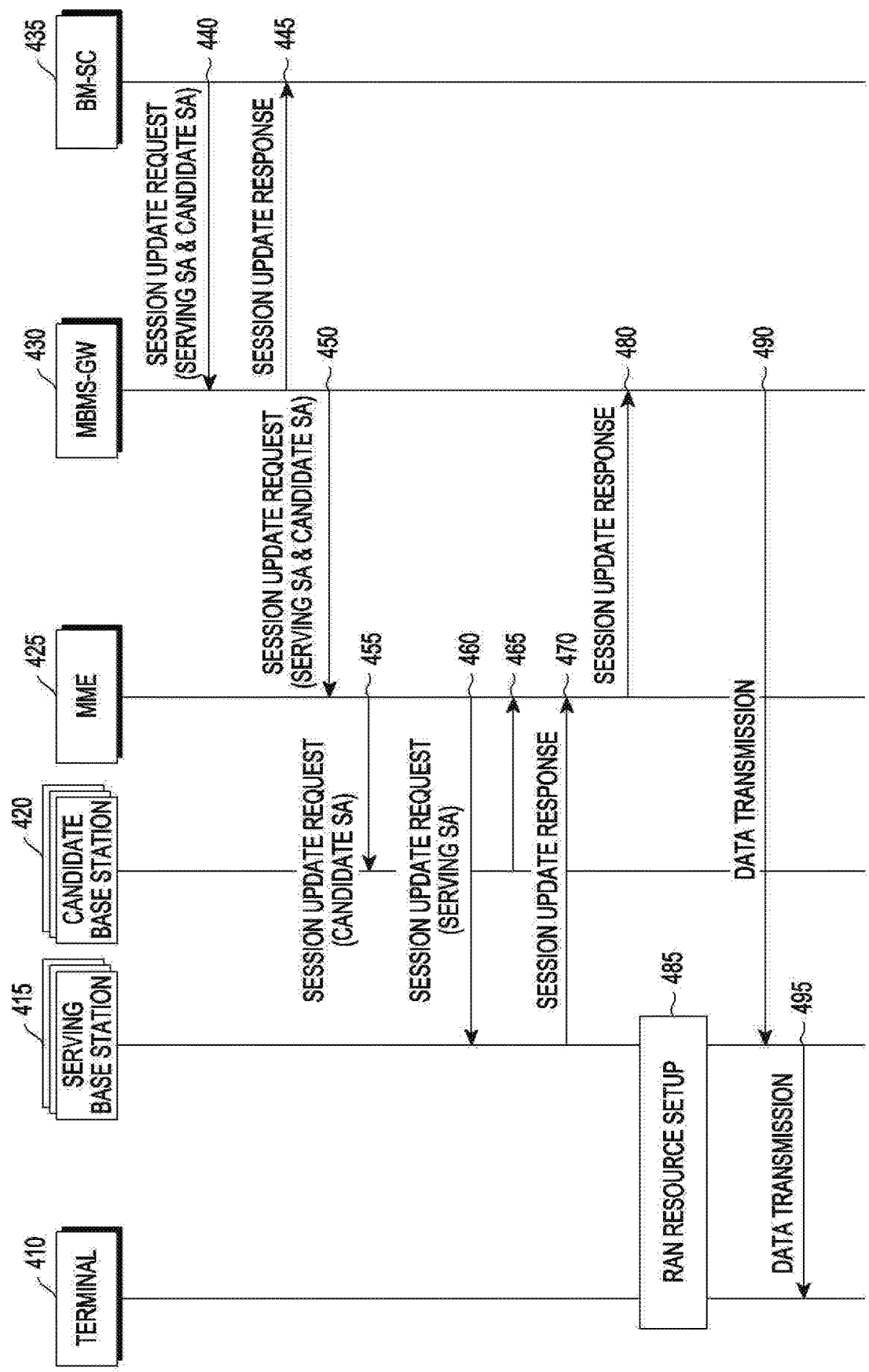
FIG. 4 is a signal flow diagram illustrating operations of entities for configuring radio bearers according to an embodiment of the disclosure.

FIG. 4 is a signal flow diagram illustrating operations of entities for configuring radio bearers according to an embodiment of the disclosure.

After identifying the serving SA and the candidate SA, in operation 440, a BM-SC 435 may transmit, to an MBMS-GW 430, a session update request for configuring a radio bearer of each of the serving SA and the candidate SA. A session update request may include information for identifying a serving SA and a candidate SA. The information for identifying a serving SA and a candidate SA may include at least one of an identifier of each of at least one cell included in a SA, geographical coordinates representing the SA, and geographical coordinates representing each of the at least one cell included in the SA, but various embodiments are not necessarily limited thereto.

In operation 445, the MBMS-GW 430 may transmit, to the BM-SC 435, a response to the received session update request.

In operation 450, the MBMS-GW 430 may deliver, to an MME 425, the session update request including the information for identifying the serving SA and the candidate SA.

In operation 455, the MME 425 may transmit the session update request, which includes the information for identifying the candidate SA, to a candidate base station 420 that provides an MBMS to the candidate SA. The candidate base station 420 may perform a session update including configuration of a radio bearer of the candidate SA in response to reception of the session update request.

In operation 460, the MME 425 may transmit the session update request, which includes the information for identifying the serving SA, to a serving base station 415 that provides an MBMS to the serving SA for a terminal 410. The serving base station 415 may perform a session update including configuration of a radio bearer of the serving SA in response to reception of the session update request.

Operations 455 and 460 may be simultaneously performed, or operation 460 may be performed before operation 455 differently from the configuration illustrated in FIG. 4.

In operation 465, the candidate base station 420 may transmit, to the MME 425, a session update response including information on a result of the execution of the session update.

In operation 470, the serving base station 415 may transmit, to the MME 425, a session update response including information on a result of the execution of the session update.

Operations 465 and 470 may be simultaneously performed, or operation 470 may be performed before operation 465 differently from the configuration illustrated in FIG. 4.

In operation 480, the MME 425 may transmit, to the MBMS-GW 430, a session update response including information on the result of the execution of the session update by each of the serving base station 415 and the candidate base station 420.

In operation 485, radio access network (RAN) resources may be set up between the serving base station 415 and the terminal 410.

In operation 490, the MBMS-GW 430 may transmit MBMS data to the serving base station 415 and, in operation 495, the serving base station 415 may transmit the MBMS data to the terminal 410 by using the set up RAN resources.

In FIG. 4, each of the serving base station 415 and the candidate base station 420 may include an MCE, and communication between the MME 425 and the serving and candidate base stations 415 and 420 are performed between the MME 425 and the MCE included in each of the serving and candidate base stations 415 and 420.

Hereinafter, a method for switching a radio bearer when a terminal enters a candidate SA will be described with reference to FIG. 5.

Figure 5:
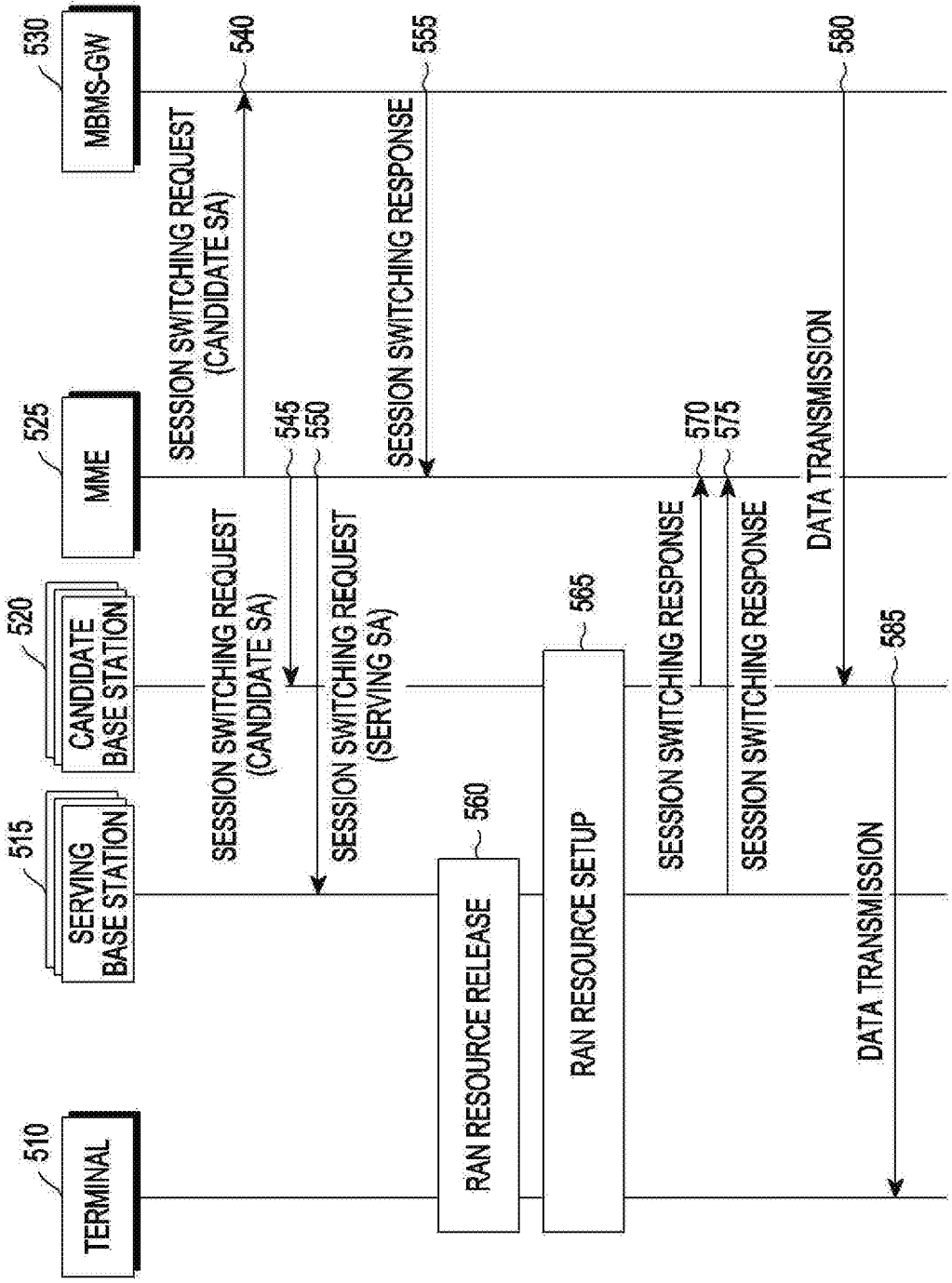
FIG. 5 is a signal flow diagram illustrating operations of entities for switching a radio bearer according to an embodiment of the disclosure.

FIG. 5 is a signal flow diagram illustrating operations of entities for switching a radio bearer according to an embodiment of the disclosure.

In operation 540, when a terminal 510 is determined to enter a candidate SA, an MME 525 may transmit a session (and/or bearer) switching request, which includes information for identifying the candidate SA, to an MBMS-GW 530. The MME 525 may determine whether the terminal 510 enters the candidate SA, by identifying a cell that the terminal 510 is accessing. For example, when the terminal 510 accesses a cell from among one or more cells constituting the candidate SA, the MME 525 may determine that the terminal 510 enters the candidate SA. Although not illustrated, the MME 525 may receive a session switching request from a serving base station 515, which has detected that the terminal 510 has left a serving SA, or from a candidate base station 520, which has detected that the terminal 510 has entered the candidate SA, and may determine that the terminal has entered the candidate SA on the basis of the received session switching request. The MBMS-GW 530 may switch an MBMS session to the candidate SA in response to the reception of the session switching request and, in operation 555, may transmit a session switching response, which includes a result of the switching, to the MME 525.

In operation 545, the MME 525 may deliver a session switching request, which includes information for identifying the candidate SA, to the candidate base station 520. The candidate base station 520 may activate a radio bearer of a pre-configured candidate SA in response to reception of the session switching request.

In operation 550, the MME 525 may transmit a session switching request, which includes information for identifying the serving SA, to the serving base station 515. The serving base station 515 may deactivate a radio bearer of the serving SA in response to reception of the session switching request.

In operation 560, the serving base station 515 may release an RAN resource configured for the terminal 510 in order to transmit an MBMS in response to the reception of the session switching request.

In operation 565, the candidate base station 520 may set up an RAN resource configured for the terminal 510 in order to transmit an MBMS in response to the reception of the session switching request.

In operation 570, the candidate base station 520 may transmit a session switching response, which includes a result of the session switching (i.e., a result of the setup of the RAN resource), to the MME 525.

In operation 575, the serving base station 515 may transmit a session switching response, which includes a result of the session switching (i.e., a result of the release of the RAN resource), to the MME 525.

In operation 580, the MBMS-GW 530 may transmit MBMS data to the candidate base station 520 and, in operation 585, the candidate base station 520 (i.e., a changed serving base station) may transmit the MBMS data to the terminal 510 by using the set up RAN resource.

Figure 6:
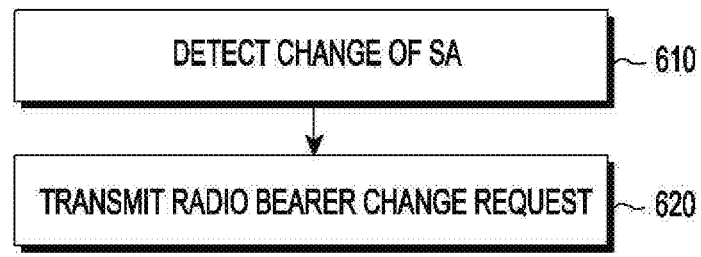
FIG. 6 is a flowchart illustrating an operation of a mobility management entity (MME) according to an embodiment of the disclosure.

FIG. 6 is a flowchart illustrating an operation of an MME for switching a radio bearer according to an embodiment of the disclosure.

In operation 610, the MME may detect a change of a SA. The change of a SA may imply that a terminal leaves a serving SA and/or enters a candidate SA. When the MME receives a bearer switching request from a serving base station or a candidate base station, the MME may determine that a SA is changed. According to another embodiment, when the MME receives a bearer switching request from a serving base station or a candidate base station, the MME may determine whether a SA is changed. According to still another embodiment, the MME may detect a change of a SA for a terminal by tracking an ID of a cell that the terminal is accessing regardless of whether the MME receives a bearer switching request from a serving base station or a candidate base station.

When the change of a SA is detected (i.e., when the terminal is detected to enter the candidate SA), in operation 620, the MME may transmit a radio bearer change request (i.e., the session switching request in FIG. 5) to a BM-SC, the serving base station, and the candidate base station.

As described above, in order to configure or switch a radio bearer of the candidate SA, a message for configuration or switching of a radio bearer may include information on a list of cells within the candidate SA. In some embodiments, the information on a list of cells within the candidate SA may exist as separate fields within the message. According to whether there exist the fields for the information on a list of cells within the candidate SA, each entity may recognize whether it is necessary to configure or switch a radio bearer of the candidate SA.

In order to perform the configuration or switching of a radio bearer of a candidate SA as described above, each of entities of a network needs to have and store a bearer context.

Figure 7:
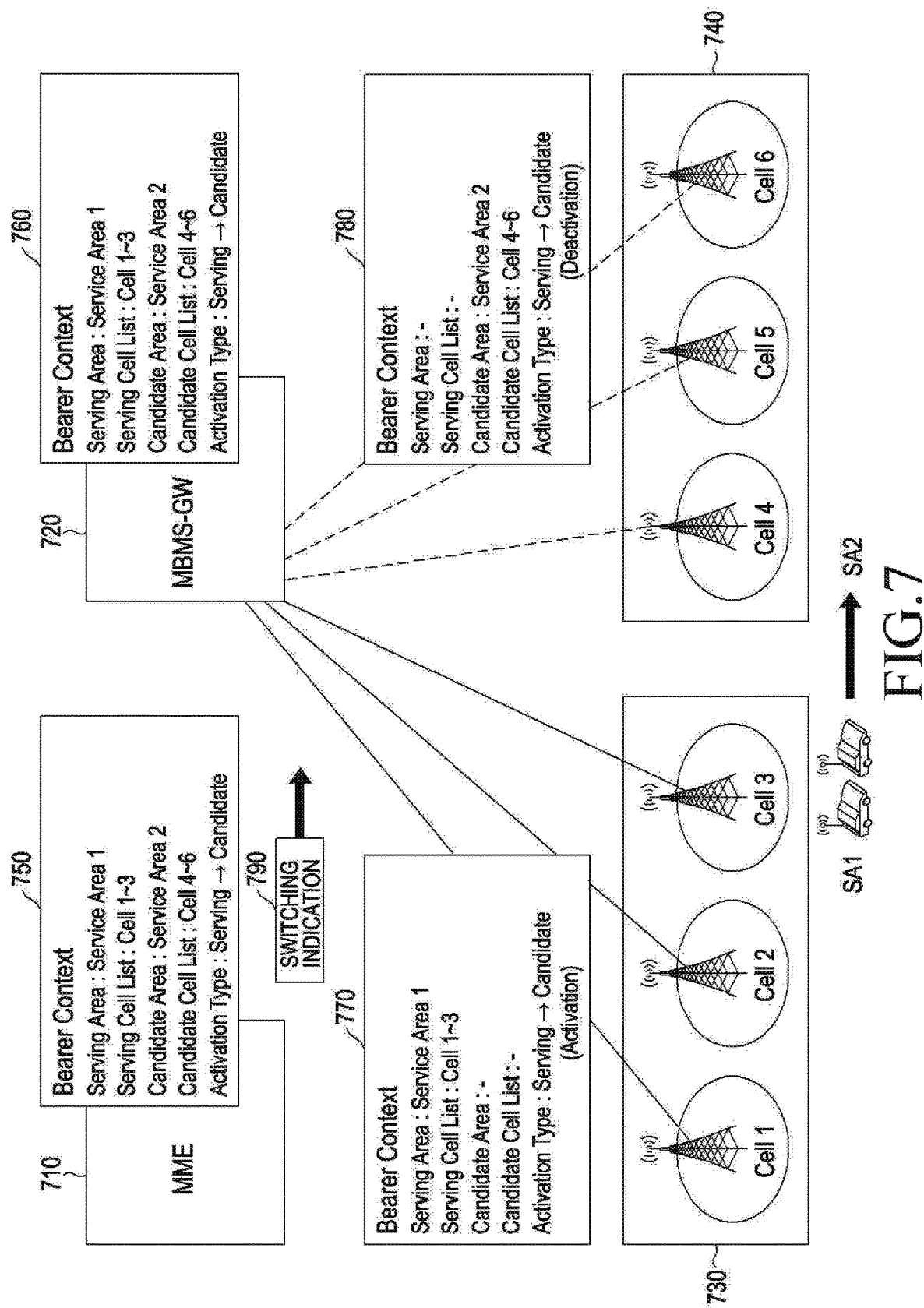
FIG. 7 is a view illustrating a configuration in which bearer contexts are stored in respective network entities according to an embodiment of the disclosure.

FIG. 7 illustrates an example of bearer contexts stored in respective network entities according to an embodiment of the disclosure.

Referring to FIG. 7, a bearer context may be stored in an MME 710, an MBMS-GW 720, at least one base station 730 of a serving SA SA1, and at least one base station 740 of a candidate SA SA2. Each of the bearer contexts 750 and 760 respectively stored in the MME 710 and the MBMS-GW 720 may include information on a serving SA (e.g., a list of cells (or cell IDs) included in the serving SA), information on a candidate SA (e.g., a list of cells (or cell IDs) included in the candidate SA), and an activation type flag for displaying a service area currently being provided. A bearer context 770 stored in the serving base station 730 (i.e., a base station of SA1) may include information on a serving SA (e.g., a list of cells (or cell IDs) included in the serving SA) and an activation type flag indicating whether a radio bearer of the serving SA is activated. A bearer context 780 stored in the candidate base station 740 (i.e., a base station of SA2) may include information on a candidate SA (e.g., a list of cells (or cell IDs) included in the candidate SA) and an activation type flag indicating whether a radio bearer of the candidate SA is activated. An activation type flag may be changed according to a switching indication 790 from the MME 710. According to some embodiments, the bearer context 770 stored in the serving base station 730 may additionally include information on a candidate SA, and the bearer context 780 stored in the candidate base station 740 may additionally include information on a serving SA. The bearer context stored in each entity may be delivered to another entity or may be updated through messages, including the session update request, the session switching request, and the like described with reference to FIGS. 4 and 5. Table 1 below shows items of the bearer contexts other than the above-described items and an entity in which each of the items is stored.

TABLE 1

| Parameter | Description | RAN | MME | MBMS-GW | BM-SC |
|---|---|---|---|---|---|
| TMGI | MBMS bearer service identification ID | | | | |
| Flow identifier | sub-flow identification ID of MBMS bearer service in broadcast mode | | | | |
| MBMS SA | ID of service area where MBMS data is transmitted | | | | |
| List of Cell ID | ID of cell where MBMS data is transmitted | | | | |
| QoS | quality of communication provided according to service to which user subscribes | | | | |
| List of downstream node | node for transmission of pieces of information for configuration of MBMS bearer | | | | |
| Access indicator | type of wireless access technology (UTRAN or E-UTRAN) | | | | |
| Time to MBMS data transfer | waiting time until MBMS data transmission (radio resource configuration is scheduled based on corresponding information) | | | | |

The above-described switching of a radio bearer may be based on management of the mobility of a vehicle or vehicle group by an MME. When a vehicle or vehicle group moves from a serving SA to a candidate SA, the MME needs to continuously estimate the location of the vehicle or vehicle group through bearer switching. Accordingly, it is necessary to support an appropriate mobility discovery procedure according to the state of a terminal.

When the terminal is provided with an MBMS in a radio resource control (RRC)-connected state, the terminal may report the location thereof to a base station whenever a cell accessed by the terminal is changed according to a measurement configuration provided by a network. To this end, when the terminal enters a candidate SA from a serving SA, the base station may transmit a bearer switching request message to the MME. When the vehicle enters a cell of a SA other than the candidate SA from the serving SA, the base station may transmit a session update request message to the MME.

When the terminal is provided with an MBMS in an RRC-idle state, the location of the terminal may be tracked on the basis of information on a serving SA and a candidate SA which is provided to the terminal in a bearer configuration process. If the vehicle is provided with information on a serving SA and a candidate SA while the terminal is in an RRC-connected state such that the terminal can recognize a change of a SA, when a SA is changed, the terminal detecting the location thereof by tracking area update (TAU) periods may transmit a bearer switching request message to a base station. The base station may deliver the received bearer switching request message to the MME. In another embodiment, an MME may configure a track area identity (TAI) list in view of serving SAs and candidate SAs. The MME may configure a TAI list of the serving SAs and a TAI list of the candidate SAs such that corresponding tracking areas (TAs) of the serving SAs do not overlap corresponding TAs of the candidate SAs. Therefore, the MME may detect the mobility of the terminal according to a conventional TAU procedure and, when a TA accessed by the terminal is changed, the terminal may transmit a TAU request to a base station simultaneously with transmitting a bearer switching request message to the MME. In some embodiments, for efficient location tracking, when an MME provides a measurement configuration to a terminal, the MME may adjust a TAU period in view of the movement speed of the terminal.

In order to provide an uninterrupted MBMS to a vehicle or a vehicle-related terminal, consideration may be given to a configuration in which an MBMS is provided through multiple communication operators (i.e., PLMNs). This configuration may be referred to as "inter-PLMN MBMS". Inter-PLMN MBMS can achieve low-delay and high-reliability communication by quickly coping with communication interruption caused by an unexpected problem of a particular PLMN, and can obtain a diversity gain by transmitting the same message through multiple transmitters.

Figure 8:
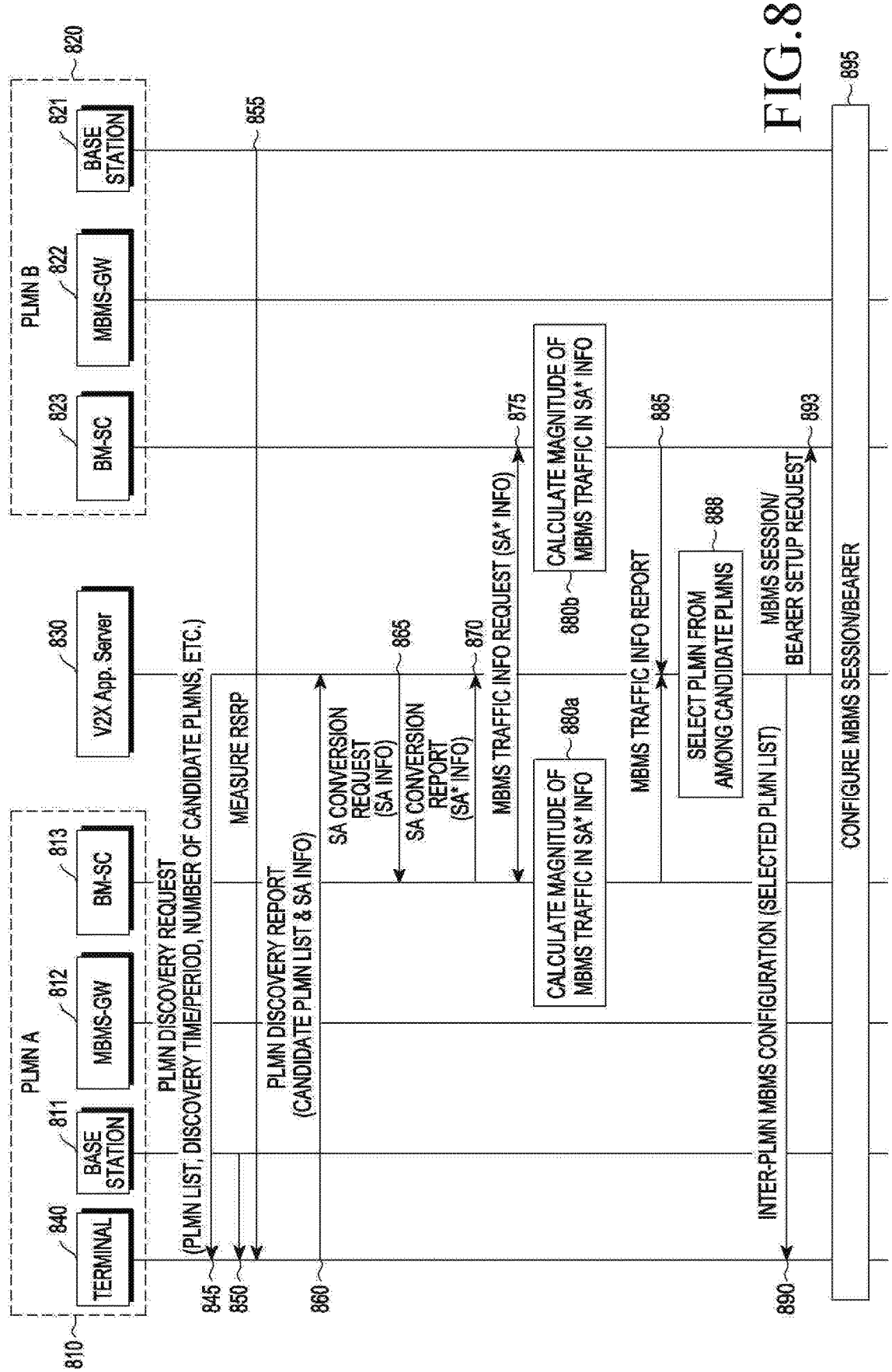
FIG. 8 is a signal flow diagram illustrating operations of entities for providing an MBMS through multiple public land mobile networks (PLMNs) according to an embodiment of the disclosure.

Hereinafter, operations of entities according to an embodiment for implementing inter-PLMN MBMS will be described with reference to FIG. 8. FIG. 8 is a signal flow diagram illustrating operations of entities for providing an MBMS through multiple PLMNs according to an embodiment of the disclosure.

A V2X AS 830 may be simply referred to as "AS". In operation 845, in order to discover a PLMN (i.e., an operator) capable of effectively providing an MBMS service to a terminal 840 (or an area where the terminal 840 is located), the V2X AS 830 may transmit a PLMN discovery (or search) request to the terminal 840. The terminal 840 is regarded as being currently served by a PLMN A 810. The PLMN A may include the terminal 840, a base station 811, an MBMS-GW 812, and a BM-SC 813. The PLMN discovery request may be accompanied by information on a list of PLMNs to be discovered, information on a time interval and a period during which a discovery is to be performed, information on the number of candidate PLMNs, and the like.

In operations 850 and 855, the terminal 840 may perform measurements on the base station 811 of the PLMN A 810 and a base station 821 of a PLMN B 820 in response to reception of the PLMN discovery request. Although not illustrated, the terminal 840 may perform measurements not only on the base stations of the PLMN A 810 and the PLMN B 820 but also on base stations of other PLMNs. In operations 850 and 855, the terminal 840 may perform measurements on downlink signals of the base stations 811 and 821, and may measure, for example, reference signal received power (RSRP) of the base stations 811 and 821.

In operation 860, the terminal 840 may transmit a PLMN discovery report to the V2X AS 830. The PLMN discovery report may include a result of the measurements performed on the base stations 811 and 821. The PLMN discovery report may include a list of PLMNs (i.e., a candidate PLMN list) including base stations of each of which the RSRP is larger than or equal to a threshold. According to some embodiments, a threshold may be changed according to the speed of the terminal 840 (or vehicle). For example, when a vehicle moves at a low speed, the vehicle has low accident risk and thus may be allowed to have relatively low reception performance, and, since there is a high probability that multiple vehicles exist around the vehicle, high MBMS traffic may be predicted. Therefore, in the case of low-speed movement, it is appropriate to transmit a message over networks of a relatively small number of operators, and thus the threshold may be set to be relatively large. In contrast, when the vehicle moves at a high speed, the vehicle has high accident risk, and thus it is required to quickly and stably receive a V2X MBMS message. Also, there is a low probability that multiple vehicles exist around the vehicle, and thus low MBMS traffic may be predicted. Therefore, a relatively small threshold may be applied to a case of high-speed movement such that a diversity gain can be acquired by utilizing networks of all available operators. The PLMN discovery report may additionally include information on a current SA for the terminal 840. The information on a current SA for the terminal 840 may include an identifier of each of at least one cell included in a SA. According to some embodiments, information on a current SA for the terminal 840 may include an identifier of the current SA among identifiers allocated to respective SAs. Such an identifier of each of cells or SAs may be uniquely configured for each PLMN (i.e., operator), and may not be mutually compatible between PLMNs.

In operation 865, the V2X AS 830 may transmit a SA conversion request, which includes information on a SA for a terminal, to the BM-SC 813 of the PLMN A 810 which is a serving PLMN for the terminal 840.

In operation 870, the BM-SC 813 may convert the received SA information into a representative value representing a SA, and may transmit a SA conversion report, which includes the converted SA information (SA* information), to the V2X AS 830. The representative value representing a SA may not represent the location of a base station and a cell related to the SA. In some embodiments, a representative value representing a SA may be set to average geographical coordinates (e.g., global positioning system (GPS) coordinates) of cells within the SA. For example, average geographical coordinates of cells within a SA may be obtained by averaging central coordinates of the respective cells within the SA. SA information represented as geographical coordinates may be compatible between PLMNs, and may allow information on a SA to be exchanged therebetween without exposing, to other PLMNs, a specific location of a base station or cell which may be regarded as a business secret against other operators.

In some embodiments, a representative value representing a SA may include multiple geographical coordinates within the SA. When a SA has a complex shape, a representative value, which represents a SA including multiple geographical coordinates, may be useful.

In some embodiments, the deployment of a network may be shared between operators or between the V2X AS 830 and each operator. In the embodiment, operations 865 and 870 may be omitted, and an MBMS traffic information request in operation 875 described below may include information for identifying a SA of a PLMN including a BM-SC that receives the MBMS traffic information request.

In operation 875, in order to request MBMS traffic information on a SA, the V2X AS 830 may transmit an MBMS traffic information request to each of the BM-SC 813 of the PLMN A 810 and the BM-SC 823 of the PLMN B 820 (i.e., to each of PLMNs within a candidate PLMN list). The MBMS traffic information request may include converted SA information.

In operations 880a and 880b, each of the BM-SC 813 of the PLMN A 810 and the BM-SC 823 of the PLMN B 820 may calculate the magnitude of traffic on converted SA information. SAs identified based on converted SA information represented as geographical coordinates may have their cell deployments and SA configurations which are different according to respective PLMNs, and thus may be different according to the same. For example, the BM-SC 813 of the PLMN A 810 may calculate a traffic load of a SA, which includes geographical coordinates indicated by the converted SA information, among SAs of the PLMN A 810, and the BM-SC 823 of the PLMN B 820 may calculate a traffic load of a SA, which includes geographical coordinates indicated by the converted SA information, among SAs of the PLMNB 820. A traffic load of a SA may be determined based on at least one of the number of bearers scheduled for the relevant SA, the number of guaranteed bit rate (GBR) bearers, and the number of maximum bit rate (MBR) bearers. In some embodiments, a traffic load may be determined in view of only bearers having a priority higher than that of a bearer for a V2X MBMS message. A period, in which each of the BM-SCs 813 and 823 measures a traffic load, may be determined in view of the number of vehicles (terminals) staying in a SA and/or the speed (e.g., average or maximum speed) of a vehicle passing through the SA.

In operation 885, each of the BM-SCs 813 and 823 may transmit an MBMS traffic information report, which includes a result of the calculation of the magnitude of traffic based on the converted SA information, to the V2X AS 830.

In operation 888, the V2X AS 830 may select a PLMN for providing an MBMS service to the terminal 840 among the candidate PLMNs on the basis of the MBMS traffic load of each of the PLMNs. The V2X AS 830 may select at least one PLMN, which has an MBMS traffic load equal to or smaller than a threshold, as a PLMN for providing an MBMS service to the terminal 840. According to some embodiments, regardless of the threshold, the V2X AS 830 may select at least one PLMN, which has a relatively small MBMS traffic load, as a PLMN for providing an MBMS service.

In operation 890, the V2X AS 830 may transmit an inter-PLMN MBMS configuration to the terminal 840. The inter-PLMN MBMS configuration may include a list of at least one PLMN selected to provide an MBMS to the terminal 840.

When the PLMN B 820 is determined to additionally provide an MBMS to the terminal 840, the V2X AS 830 may transmit, to the BM-SC 823 of the PLMN B 820, an MBMS session/bearer setup request for providing an MBMS to the terminal 840 in operation 893.

In operation 895, the BM-SC 823 having received the MBMS session/bearer setup request may transmit the MBMS session/bearer setup request to an MBMS-GW 822. An MBMS session/bearer setup request message delivered to the MBMS-GW 822 may include information on a TMGI, a flow identifier, QoS, an MBMS SA, a cell ID list, an MBMS data transmission time, and the like. The MBMS-GW 822 may configure a new MBMS bearer context needed by an MME and may transmit the configured new MBMS bearer context to the MME through an MBMS session/bearer setup request message. The MME may also configure a new MBMS bearer context and may transmit the configured new MBMS bearer context to an RAN (E-UTRAN or UTRAN). The RAN having received the new MBMS bearer context may configure a radio resource for transmitting MBMS data to the terminal 840, and may provide an MBMS service to the terminal 840 on the configured radio resource. In the embodiment, each of entities that receives an MBMS session/bearer setup request message may transmit an MBMS session/bearer setup response message to an entity having transmitted the MBMS session/bearer setup request message.

According to some embodiments, a change of a PLMN for providing an inter-PLMN MBMS may be triggered by the overload of a particular PLMN. Specifically, when it is determined that traffic in a SA where the terminal is located is excessive, a BM-SC of one PLMN that provides an MBMS to a terminal among PLMNs may transmit an MBMS traffic overload report to a V2X AS. The V2X AS may transmit, to a BM-SC of the relevant PLMN, a response to the MBMS traffic overload report. Then, the V2X AS may transmit an MBMS traffic information request to a BM-SC of each of candidate PLMNs, and may select a PLMN that is to provide an MBMS instead of a PLMN, which has transmitted a traffic overload report among the candidate PLMNs, on the basis of MBMS traffic load information received in response to the transmitted MBMS traffic information request. Then, the V2X AS may transmit an MBMS session and bearer release request to a BM-SC of the PLMN having transmitted the traffic overload report, and the BM-SC having received the MBMS session and bearer release request may perform operations for releasing an MBMS session and bearer for the terminal. Also, the V2X AS may notify the terminal of an MBMS configuration including a list of at least one PLMN for providing a new MBMS, and may transmit an MBMS session and bearer setup request to a BM-SC of the selected PLMN.

According to some embodiments, a change of a PLMN for providing an inter-PLMN MBMS may be triggered according to a change of a SA to which a terminal (or vehicle) belongs. The terminal may receive information on a SA, to which the terminal belongs, from a base station. The base station may broadcast SA information through a system information block 15 (SIB 15). A UE may recognize a change of a SA to which the UE belongs, by listening to the SIB 15. When the UE identifies the change of the SA to which the UE belongs, the UE may discover a PLMN and may transmit a PLMN discovery report. The PLMN discovery report may be substantially identical to the PLMN discovery report described in operation 845 of FIG. 8. Then, in order to reconfigure a PLMN configuration for an MBMS, operations after operation 845 of FIG. 8 may be performed. In this regard, an MBMS session/bearer release request may be transmitted to the BM-SC of the PLMN that, according to reconfiguration of a PLMN configuration, has previously provided an MBMS to the terminal but has been determined not to provide the same any longer.

Figure 9:
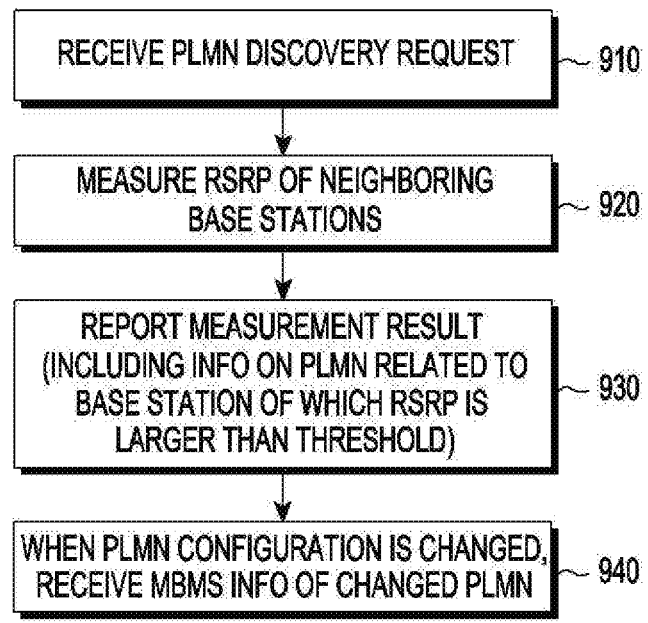
FIG. 9 is a flowchart illustrating an operation of a terminal for receiving an MBMS provided through multiple PLMNs according to an embodiment of the disclosure.

Hereinafter, an operation of a terminal for supporting an inter-PLMN MBMS will be described with reference to FIG. 9. FIG. 9 is a flowchart illustrating an operation of a terminal for receiving an MBMS provided through multiple PLMNs according to an embodiment of the disclosure.

In operation 910, the terminal may receive a PLMN discovery request. The PLMN discovery request may include information on a list of PLMNs to be discovered and information on a time interval and a period during which a discovery is to be performed.

In operation 920, the terminal may measure RSRP of each of neighboring base stations in response to the reception of the PLMN discovery request. The terminal may measure RSRP only on each of base stations of the PLMNs included in the list.

In operation 930, the terminal may report, to a V2X AS, a result of the measurement of RSRP. A report on the result of the measurement may include information (a list of PLMNs) on a PLMN including a base station of which the RSRP is larger than a threshold.

In operation 940, when a PLMN configuration is changed (e.g., when a PLMN providing an MBMS to the terminal is added, removed, or changed), the terminal may receive, from the V2X AS, information on an MBMS of the changed PLMN. The information on an MBMS of the changed PLMN may include a list of at least one PLMN determined to provide an MBMS to the terminal.

Figure 10:
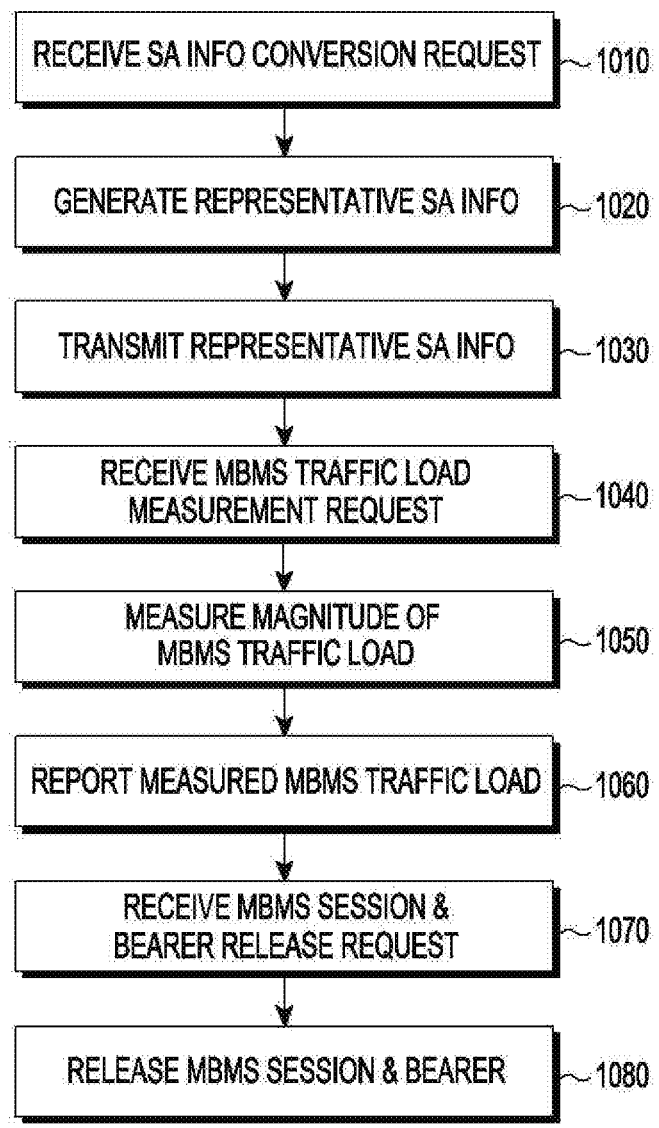
FIG. 10 is a flowchart illustrating an operation of a BM-SC for providing an MBMS through multiple PLMNs according to an embodiment of the disclosure.

Hereinafter, an operation of a BM-SC for supporting an inter-PLMN MBMS will be described with reference to FIG. 10. FIG. 10 is a flowchart illustrating an operation of a BM-SC for providing an MBMS through multiple PLMNs according to an embodiment of the disclosure.

In operation 1010, the BM-SC may receive a SA information conversion request from a V2X AS. The SA information conversion request may include information for identifying a SA of which the information conversion has been requested.

In operation 1020, the BM-SC may generate representative SA information, which is representative of the SA of which the information conversion has been requested, in response to the SA information conversion request. The representative SA information may be represented as average geographical coordinates of cells within the relevant SA.

In operation 1030, the BM-SC may transmit the generated representative SA information to the V2X AS. In some embodiments, operations 1010, 1020, and 1030 may be performed only when a PLMN including the BM-SC is a serving PLMN for a terminal to which an MBMS is desired to be provided.

In operation 1040, the BM-SC may receive an MBMS traffic load measurement request. The MBMS traffic load measurement request may include representative SA information of a SA of which a traffic load is to be measured.

In operation 1050, the BM-SC may measure the magnitude of a traffic load of the SA corresponding to the representative SA information. The SA corresponding to the representative SA information may be determined as a SA including geographical coordinates indicated by the representative SA information among SAs of the PLMN including the BM-SC.

In operation 1060, the BM-SC may report the measured MBMS traffic load to the V2X AS.

In operation 1070, the BM-SC may receive an MBMS session and bearer release request from the V2X AS. When the PLMN including the BM-SC cannot provide an MBMS to the terminal any longer or when a traffic load of the BM-SC is determined to be excessive (e.g., larger than or equal to a threshold), the V2X AS may transmit an MBMS session and bearer release request to the BM-SC.

In operation 1080, the BM-SC may release an MBMS session and bearer for the terminal in response to reception of the MBMS session and bearer release request.

Figure 11:
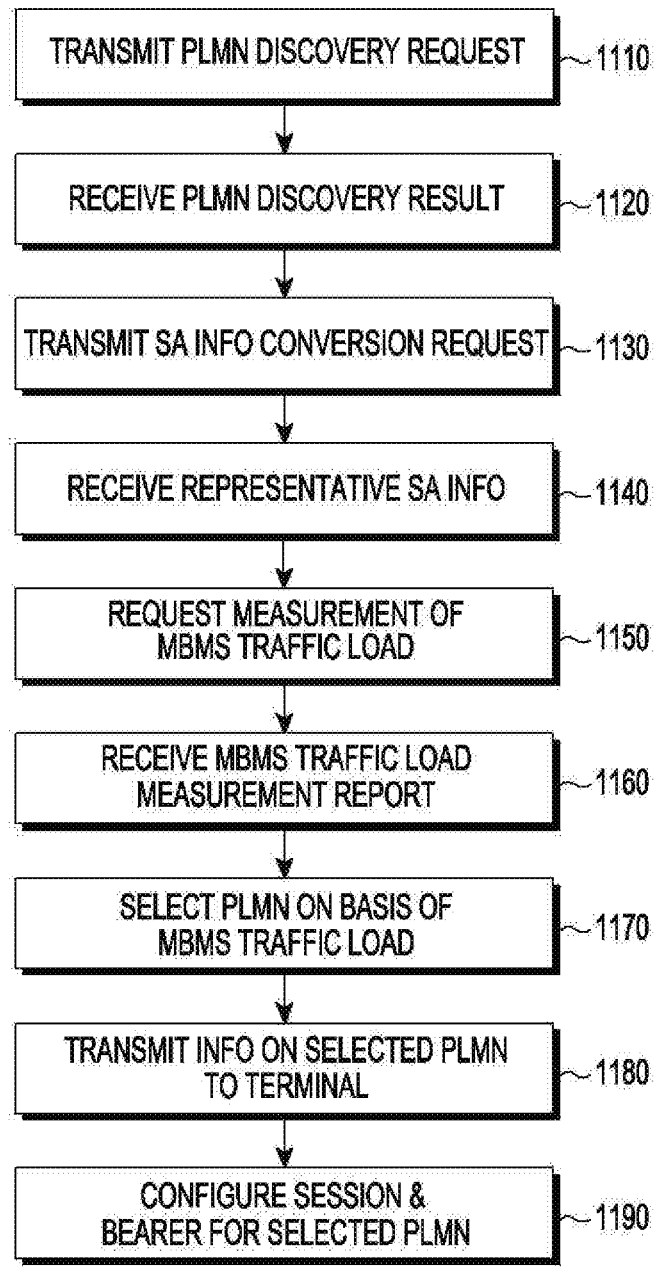
FIG. 11 is a flowchart illustrating an operation of an application server (AS) for providing an MBMS through multiple PLMNs according to an embodiment of the disclosure.

Hereinafter, an operation of a V2X AS for supporting an inter-PLMN MBMS will be described with reference to FIG. 11. FIG. 11 is a flowchart illustrating an operation of an AS for providing an MBMS through multiple PLMNs according to an embodiment of the disclosure.

In operation 1110, a V2X AS may transmit a PLMN discovery request to a terminal.

In operation 1120, the V2X AS may receive a report on a result of the PLMN discovery, from the terminal in response to the PLMN discovery request. The report on the result of the PLMN discovery may include a list of PLMNs (i.e., a candidate PLMN list) including bases stations of each of which the RSRP is larger than or equal to a threshold.

In operation 1130, the V2X AS may transmit a SA information conversion request, which includes information for identifying a particular SA, to a BM-SC of a serving PLMN for the terminal.

In operation 1140, the V2X AS may receive representative SA information from the BM-SC in response to the SA information conversion request. The representative SA information may be average geographical coordinates of cells within a SA of which the information conversion has been requested.

In operation 1150, the V2X AS may transmit an MBMS traffic load measurement request to a BM-SC of each of at least one candidate PLMN. The MBMS traffic load measurement request may include representative SA information.

In operation 1160, the V2X AS may receive an MBMS traffic load measurement report according to measurement of an MBMS traffic load of a SA, which includes geographical coordinates indicated by the representative SA information among SAs of a PLMN including the BM-SC of each of the at least one candidate PLMN, from the BM-SC thereof.

In operation 1170, the V2X AS may select at least one PLMN, which is to provide an MBMS to the terminal, on the basis of the received MBMS traffic load measurement report among the at least one candidate PLMN.

In operation 1180, the V2X AS may transmit, to the terminal, information on the at least one PLMN selected to provide an MBMS to the terminal.

In operation 1190, the V2X AS may transmit a session and bearer configuration request to the PLMN selected to provide an MBMS to the terminal. The session and bearer configuration request in operation 1190 may be transmitted to a BM-SC of the selected PLMN.

Figure 12:
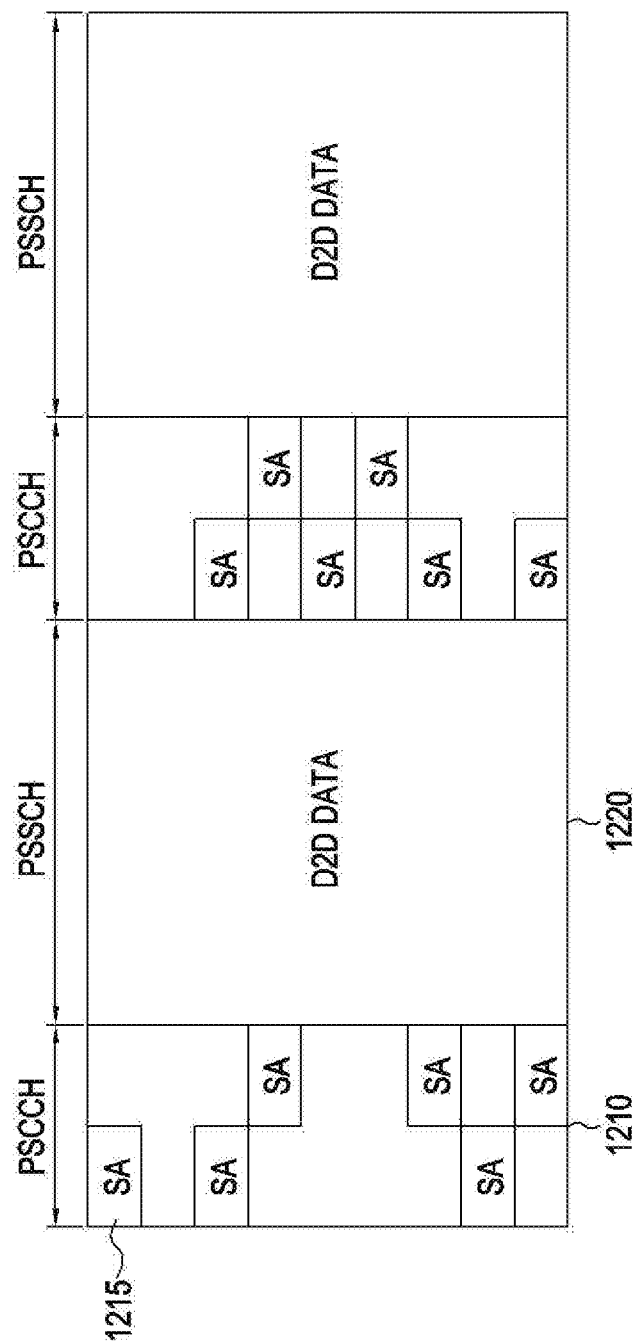
FIG. 12 is a view illustrating a radio resource framework for device-to-device (D2D) communication according to an embodiment of the disclosure.

A vehicle or vehicle-related terminal may perform D2D communication. The vehicle may perform D2D communication with another vehicle, a neighboring pedestrian terminal, and a road side unit (RSU). Hereinafter, D2D communication of a vehicle or vehicle-related terminal according to an embodiment will be described with reference to FIGS. 12 and 13. FIG. 12 is a view illustrating a radio resource framework for D2D communication according to an embodiment of the disclosure.

Referring to FIG. 12, D2D communication of a vehicle may be based on a half-duplex scheme. A frame for D2D communication of a vehicle may include a physical sidelink control channel (PSCCH) 1210 and a physical sidelink shared channel (PSSCH) 1220. The PSCCH 1210 and the PSSCH 1220 may be simply referred to as "control channel" and "shared channel", respectively.

The vehicle or terminal may select some radio resources among radio resources of the PSCCH 1210 and may transmit a scheduling assignment (SA) message 1215 on the selected some radio resources. The SA message 1215 may include a destination ID and information on a resource pattern for transmission (RPT) to be used to transmit data through the corresponding PSSCH 1220. The vehicle or terminal may avoid a collision between data transmissions on the PSSCH 1220 by selecting one of multiple defined RPTs. A reception terminal may selectively listen to necessary data through the PSSCH 1220 on the basis of the received SA message 1215.

Figure 13:
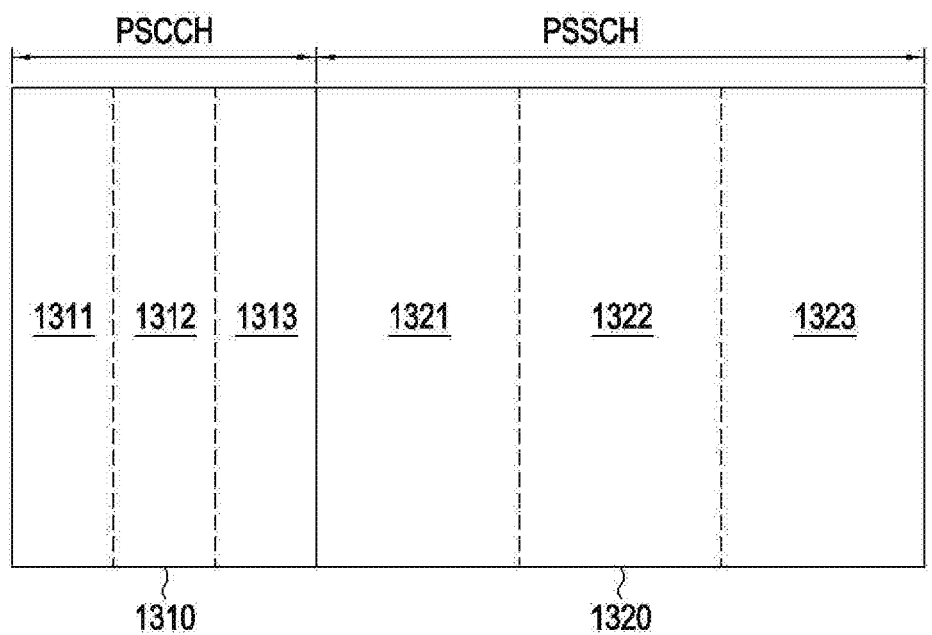
FIG. 13 is a view illustrating a channel structure for D2D communication according to an embodiment of the disclosure.

FIG. 13 is a view illustrating a channel structure for D2D communication according to an embodiment of the disclosure.

Referring to FIG. 13, a PSCCH 1310 may be divided into multiple areas 1311, 1312, and 1313 according to a priority assigned to a vehicle or terminal. The priority assigned to a vehicle or terminal may be changed according to the type of vehicle. For example, a higher priority may be assigned to a vehicle, such as an ambulance or a fire-fighting vehicle, related to urgent and public business. The vehicle may transmit a SA message through an area corresponding to a priority assigned thereto among the multiple areas 1311, 1312, and 1313 within the PSCCH 1310. The multiple areas 1311, 1312, and 1313 within the PSCCH 1310 may be placed according to their corresponding priorities. Specifically, an area having a higher priority may be preferentially placed in time. For example, a vehicle, which has a priority assigned to correspond to the area 1311 having a priority higher than that of the area 1312, may transmit a SA message thereof through the area 1311, and a vehicle, which has a priority assigned to correspond to the area 1312 having a priority higher than that of the area 1313, may transmit a SA message thereof through the area 1312. Through this configuration, a SA message of a vehicle having a higher priority may be preferentially transmitted in time, so as to allow D2D communication thereof to preferentially occupy resources within a PSSCH 1320, thereby ensuring stable communication.

According to some embodiments, the PSSCH 1320 may also be divided into multiple areas 1321, 1322, and 1323 according to a priority. The multiple areas 1321, 1322, and 1323 within the PSSCH 1320 may be placed according to their corresponding priorities. Specifically, an area having a higher priority may be preferentially placed in time.

In the above-described frame structure for D2D communication of a vehicle, an independent radio resource pool is not allocated for each of types of terminal (or vehicle) and service, so that the use efficiency of radio resources can be improved and signaling overhead required to indicate each pool can be reduced. Also, through the discriminating use of a PSCCH, it is possible to support discriminating SA message transmission according to the type of terminal (or vehicle) or the type of service. Through this configuration, it is possible to prevent a collision between SA message transmissions caused by the limitations of a half-duplex scheme.

Figure 14:
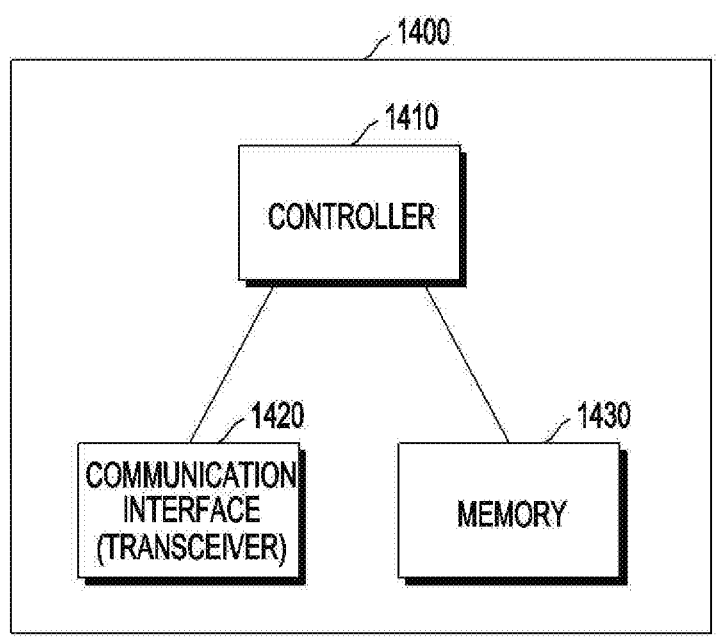
FIG. 14 is a block diagram illustrating a configuration of an entity according to an embodiment.

Hereinafter, configurations of the entities described in the various embodiments will be described with reference to FIG. 14. FIG. 14 is a block diagram illustrating a configuration of an entity according to an embodiment of the disclosure of the disclosure.

Referring to FIG. 14, the entity 1400 may be one of the entities described in the various embodiments. For example, the entity 1400 may be one of the terminal, the BM-SC, the MME, the base station, the V2X AS, the MCE, the PDN-GW, and the MBMS-GW.

The entity 1400 may include a controller 1410, a communication interface 1420, and a memory 1430. The controller 1410 may connected to the communication interface 1420 and the memory 1430 and may control operations of the communication interface 1420 and the memory 1430. The controller 1410 may directly perform operations performed by the entity 1400, or may indirectly perform operations performed thereby by controlling the communication interface 1420, the memory 1430, and other elements that are not illustrated. That is, operations performed by the entity 1400 may be regarded as being substantially performed by the controller 1410. The controller 1410 may be implemented by one or more processors.

The communication interface 1420 may transmit and/or receive data to/from another entity. The communication interface 1420 may be referred to as "transceiver".

The memory 1430 may store pieces of information that the entity 1400 needs in order to perform an operation. For example, the memory 1430 may store commands to be performed by the controller 1410, temporal or permanent data that the controller 1410 needs in order to process arithmetic operations, and information required to configure a configuration of the entity 1400, but various embodiments are not limited thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for providing a multimedia broadcast/multicast service (MBMS) to a terminal in a vehicle by a broadcast and multicast service center (BM-SC), the method comprising:
   identifying at least one candidate service area that the terminal is predicted to pass through; and
   transmitting, to an MBMS-gateway (MBMS-GW), an MBMS bearer setup request for configuring a radio bearer of the at least one candidate service area,
   wherein the MBMS bearer setup request indicates the MBMS-GW to store at least one MBMS bearer context including information on a list of cells included in the at least one candidate service area and an activation type flag indicating whether each radio bearer of the at least one candidate service area is activated, and
   wherein the activation type flag is changed according to a switching indication from a mobility management entity (MME) related to the terminal.

2. The method of claim 1, wherein the at least one candidate service area is predicted based on a cell where the terminal is currently located and a movement direction of the terminal.

3. The method of claim 1, wherein the at least one candidate service area is predicted based on information on a movement path of the vehicle which is received from a navigation mounted to the vehicle.

4. The method of claim 1, wherein, when the vehicle moves along a fixed path, the at least one candidate service area is predicted based on the fixed path.

5. The method of claim 1, wherein the identifying of the at least one candidate service area that the terminal is predicted to pass through comprises:
   determining whether an expected path of the terminal is predictable; and
   predicting at least one service area that the terminal is to pass through, when the expected path of the terminal is predictable.

6. The method of claim 1, wherein the identifying of the at least one candidate service area that the terminal is predicted to pass through comprises:
   receiving, from an application server, an identifier of at least one cell that the terminal is predicted to pass through; and
   identifying the at least one candidate service area that the terminal is predicted to pass through, based on the received identifier of the at least one cell.

7. The method of claim 1, wherein the MBMS bearer setup request comprises information on the identified at least one candidate service area and information on a serving service area.

8. The method of claim 1, further comprising:
   receiving, from an application server, a conversion request of information to on a current service area of the terminal;
   converting identifiers of cells included in the current service area to geographical location information, representing the current service area, in response to the receiving of the conversion request; and transmitting the geographical location information to the application server.

9. The method of claim 8, further comprising:

receiving a request for an MBMS traffic load together with the geographical location information from the application server;

measuring an MBMS traffic load of the current service area in response to the receiving of the request for the MBMS traffic load; and transmitting, to the application server, a result of the measuring of the MBMS traffic load of the current service area.

10. A broadcast and multicast service center (BM-SC) for providing a multimedia broadcast/multicast service (MBMS) to a terminal in a vehicle, the BM-SC comprising:

a transceiver; and at least one processor connected to the transceiver and configured to:

identify at least one candidate service area that the terminal is predicted to pass through, and transmit, to an MBMS-gateway (MBMS-GW), an MBMS bearer setup request for configuring a radio bearer of the at least one candidate service area, wherein the MBMS bearer setup request indicates the MBMS-GW to store at least one MBMS bearer context including information on a list of cells included in the at least one candidate service area and an activation type flag indicating whether each radio bearer of the at least one candidate service area is activated, and wherein the activation type flag is changed according to a switching indication from a mobility management entity (MME) related to the terminal.

11. The BM-SC of claim 10, wherein the at least one processor is further configured to:

receive, from an application server, a conversion request of information on a current service area of the terminal, convert identifiers of cells included in the current service area to geographical location information representing the current service area, in response to the reception of the conversion request, and transmit the geographical location information to the application server.

* * * * *